United States Patent
Miyake et al.

(10) Patent No.: US 10,913,677 B2
(45) Date of Patent: Feb. 9, 2021

(54) DOUBLE GLAZING AND METHOD FOR MANUFACTURING SAME

(71) Applicant: Hitachi, Ltd., Tokyo (JP)

(72) Inventors: Tatsuya Miyake, Tokyo (JP); Takashi Naitou, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/608,057

(22) PCT Filed: Feb. 28, 2018

(86) PCT No.: PCT/JP2018/007386
§ 371 (c)(1),
(2) Date: Oct. 24, 2019

(87) PCT Pub. No.: WO2018/207435
PCT Pub. Date: Nov. 15, 2018

(65) Prior Publication Data
US 2020/0189954 A1 Jun. 18, 2020

(30) Foreign Application Priority Data
May 10, 2017 (JP) ................................. 2017-093551

(51) Int. Cl.
*E06B 3/66* (2006.01)
*C03B 23/24* (2006.01)
(Continued)

(52) U.S. Cl.
CPC ............ *C03B 23/245* (2013.01); *B32B 17/06* (2013.01); *B32B 37/06* (2013.01); *B32B 37/18* (2013.01);
(Continued)

(58) Field of Classification Search
CPC .. E06B 3/6612; E06B 3/6775; E06B 3/67365; E06B 3/677; E06B 3/67334; E06B 3/66357; Y02A 30/249; Y02B 80/22
See application file for complete search history.

(56) References Cited

U.S. PATENT DOCUMENTS 5,657,607 A * 8/1997 Collins ................. E06B 3/6612
52/786.13
6,383,580 B1 * 5/2002 Aggas ................. E06B 3/66304
156/109
(Continued)

FOREIGN PATENT DOCUMENTS

JP          2002-80247 A     3/2002
JP         2015-523300 A     8/2015
(Continued)

OTHER PUBLICATIONS

International Search Report (PCT/ISA/210) issued in PCT Application No. PCT/JP2018/007386 dated May 1, 2018 with English translation (four (4) pages).
(Continued)

*Primary Examiner* — Donald J Loney
(74) *Attorney, Agent, or Firm* — Crowell & Moring LLP (57) ABSTRACT

An object of the invention is to provide a multilayer glass which can be manufactured by a simple process. To solve the above problem, the multilayer glass according to the invention includes a first glass substrate, a second glass substrate that faces the first glass substrate at an interval of a predetermined space, and a sealing part that seals a periphery of an internal space defined by the first glass substrate and the second glass substrate. The sealing part is formed with a sealing material containing low melting point glass. The internal space is in a vacuum state. The first glass substrate includes an exhaust port that is provided to be included in a projection part of the sealing part when being projected in a
(Continued)

lamination direction of the first glass substrate and the second glass substrate. The exhaust port is blocked by the sealing material (see FIG. 3).

11 Claims, 9 Drawing Sheets

(51) Int. Cl.
*B32B 17/06* (2006.01)
*B32B 37/06* (2006.01)
*B32B 37/18* (2006.01)
*E06B 3/677* (2006.01)
*E06B 3/673* (2006.01)

(52) U.S. Cl.
CPC .......... *E06B 3/6612* (2013.01); *E06B 3/6775* (2013.01); *B32B 2315/08* (2013.01); *B32B 2419/00* (2013.01); *E06B 3/67365* (2013.01)

(56) References Cited

U.S. PATENT DOCUMENTS

| | | |
|---|---|---|
| 2013/0302542 A1 | 11/2013 | Jones |
| 2015/0068666 A1 | 3/2015 | Abe et al. |
| 2016/0060158 A1 | 3/2016 | Naito et al. |
| 2018/0320436 A1 | 11/2018 | Abe et al. |

FOREIGN PATENT DOCUMENTS

| | | |
|---|---|---|
| JP | 5821010 B2 | 11/2015 |
| JP | 2016-50135 A | 4/2016 |
| WO | WO 2017/056422 A1 | 4/2017 |

OTHER PUBLICATIONS

Japanese-language Written Opinion (PCT/ISA/237) issued in PCT Application No. PCT/JP2018/007386 dated May 1, 2018 (three (3) pages).

* cited by examiner

DOUBLE GLAZING AND METHOD FOR MANUFACTURING SAME

TECHNICAL FIELD

The present invention relates to a multilayer glass and a method for manufacturing the same.

BACKGROUND ART

Multilayer glass is applied to an opening part where energy saving is required, such as window glass for a building material, a door of a commercial refrigerator and a freezer, and a window material for a transportation facility such as an automobile which require high heat insulation performance. In recent years, with a demand for window glass having excellent heat insulation performance, multilayer glass having heat insulation performance is used at high frequency and spreads rapidly.

The multilayer glass includes multilayer glass panels in which a space defined by plate glass facing each other is filled with air or noble gas such as argon, or vacuum insulation multilayer glass panels in which a space between the vacuum insulation multilayer glass panels is evacuated.

In order to seal a space (hereinafter, referred to as a gap part) defined by a pair of plate glass, glass that has a low melting point and low gas permeability is used in a vacuum sealing part of vacuum insulation multilayer glass. Since the gap part is damaged by a pressure difference between pressure of the gap part and the atmospheric pressure at the time of vacuum sealing, spacers are disposed at equal intervals in the gap part so as not to break glass panels, and an interval between the glass panels is kept at a thickness of about 0.2 mm. In order to achieve further improvement of heat insulation performance, the multilayer glass may include two heat insulation layers which are a vacuum layer and a noble gas filling layer of about 10 mm.

The vacuum insulation multilayer glass is generally manufactured by evacuating the gap part in the glass panels using an exhaust pipe.

PTL 1 discloses a method for manufacturing a multilayer glass by evacuating a space that is sealable between plate glass into a vacuum state and dividing the space into an exhaust port region including an exhaust port and a decompression region other than the exhaust port region by a region forming material disposed in the space.

PTL 2 discloses a low pressure multilayer glass in which straight lines parallel to sides separated from end parts of a side sealing material by 3 cm are defined as boundary lines, a circle having a radius of 2 cm is drawn and inscribed on the boundary lines, which are parallel to two sides of the end parts of the side sealing material, in the vicinity of a corner, an arc at a corner side between two contact points of the circle is defined as a boundary line, and an exhaust opening part is provided at a center side more central than the boundary line. An exhaust pipe is connected to the exhaust opening part and is coupled to an exhaust unit. A space defined by two pieces of plate glass is sealed by welding or the like the exhaust pipe after the space is decompressed.

PRIOR ART LITERATURE

Patent Literature

PTL 1: Japanese Patent No. 5821010
PTL 2: JP-A-2002-080247

SUMMARY OF INVENTION

Technical Problem

In the method disclosed in PTL 1, since the space defined by two pieces of plate glass is divided into the exhaust port region and the decompression region by the region forming material, a step of forming the region forming material is necessary. In addition, since it is necessary to exhaust a slit-like gap after the space defined by the two pieces of plate glass is decompressed, the space may not be sufficiently evacuated.

In the method disclosed in PTL 2, it is necessary to weld the exhaust pipe after the space defined by the two pieces of plate glass is decompressed. It is desirable to develop a multilayer glass and a method for manufacturing the same that can reduce the number of manufacturing steps and the number of components and be prepared by a simple manufacturing process.

Therefore, an object of the invention is to provide a multilayer glass that can be manufactured by a simple process.

Solution to Problem

The multilayer glass according to the invention includes a first glass substrate, a second glass substrate that faces the first glass substrate at an interval of a predetermined space, and a sealing part that seals a periphery of an internal space defined by the first glass substrate and the second glass substrate. The sealing part is formed with a sealing material containing low melting point glass. The internal space is in a vacuum state. The first glass substrate includes an exhaust port that is provided to be included in a projection part of the sealing part when being projected in a lamination direction of the first glass substrate and the second glass substrate. The exhaust port is blocked by the sealing material.

Advantageous Effect

According to the invention, it is possible to provide the multilayer glass that can be manufactured by a simple process.

DESCRIPTION OF EMBODIMENTS

Hereinafter, an embodiment of the invention will be described in detail with reference to the drawings. However, the invention is not limited to the embodiment described here, and various combinations and improvements can be made without departing from the scope of the invention.

Figure 1:
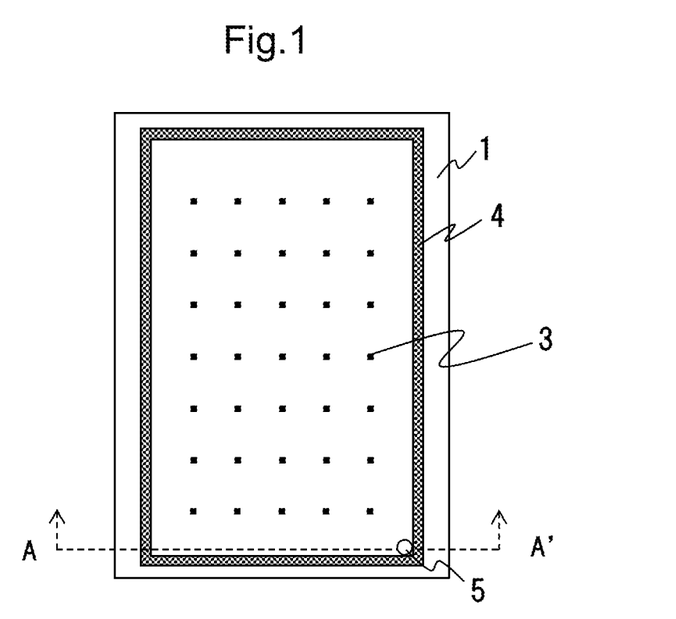
FIG. 1 is a top view of a multilayer glass in a state before sealing according to an embodiment of the invention.
Figure 2:
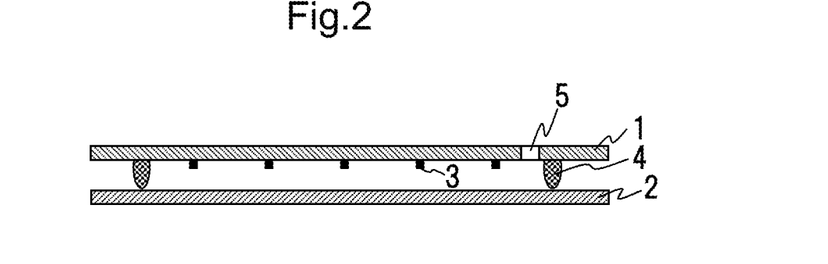
FIG. 2 is a cross-sectional view of a cross-section A-A' of the multilayer glass in FIG. 1.

FIG. 1 is a top view of multilayer glass in a state before sealing according to an embodiment of the invention and FIG. 2 is a cross-sectional view of a cross-section A-A' in FIG. 1. The multilayer glass before sealing includes a first glass substrate 1, a second glass substrate 2 that faces the first glass substrate 1 at an interval of a predetermined space, and a sealing material 4 that seals a periphery of an internal space defined by the first glass substrate 1 and the second glass substrate 2. The sealing material 4 is temporarily baked on the first glass substrate 1. The first glass substrate 1 includes an exhaust port 5 at a position in contact with the sealing material 4 that is temporarily baked. A plurality of spacers 3 are disposed in the internal space between the first glass substrate 1 and the second glass substrate. A coating height of the sealing material 4 is about three times a height of the spacers 3.

Figure 3:
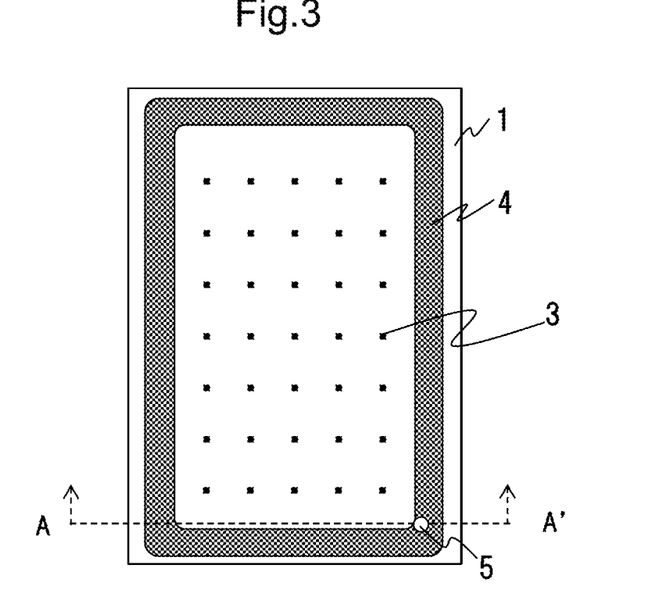
FIG. 3 is a top view of the multilayer glass in a state after sealing according to the embodiment of the invention.
Figure 4:
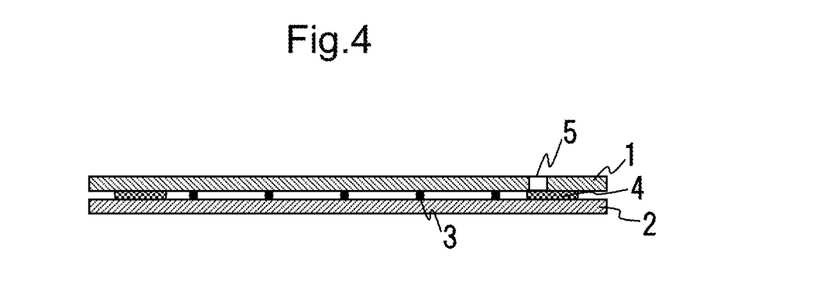
FIG. 4 is a cross-sectional view of the cross-section A-A' of the multilayer glass in FIG. 3.

FIG. 3 is a top view of the multilayer glass in a state after sealing according to the embodiment of the invention and FIG. 4 is a cross-sectional view of the cross-section A-A' in FIG. 3. In the multilayer glass after sealing, the temporarily baked sealing material 4 is crushed to the height of the spacers 3 and is stretched to form a sealing part 4. The exhaust port 5 is blocked by the sealing material 4 and is included in a projection part of the sealing part 4 when projected in a lamination direction of the first glass substrate and the second glass substrate. The internal space defined by the first glass substrate and the second glass substrate is in a vacuum state. In the present description, the vacuum state refers to a state in which pressure is lower than the atmospheric pressure.

Figure 5:
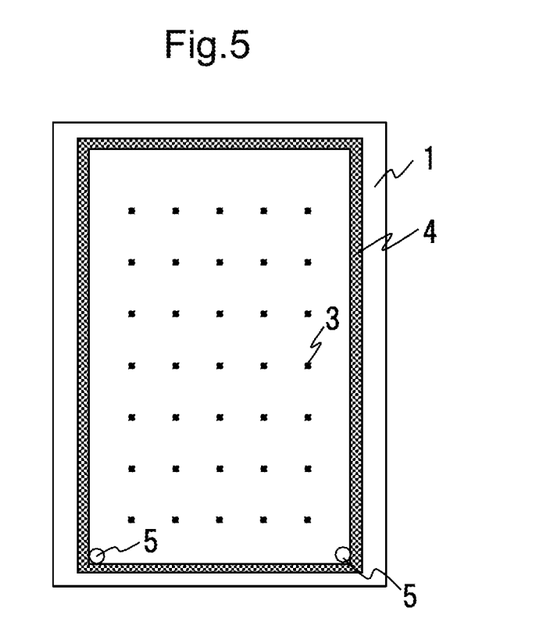
FIG. 5 is a top view of a multilayer glass in a state before sealing according to an embodiment of the invention.

FIG. 5 shows a multilayer glass before sealing that includes a plurality of exhaust ports. Positions and the number of the exhaust ports are not particularly limited as long as the exhaust ports are provided at positions adjacent to the sealing material 4. The efficiency of evacuation can be increased by increasing the number of exhaust ports. However, as the number of exhaust ports increases, strength of a glass panel itself may decrease.

Figure 6:
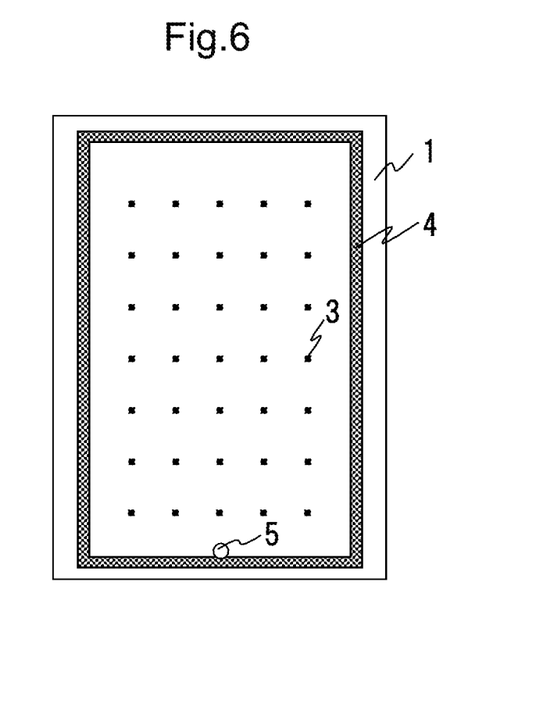
FIG. 6 is a top view of a multilayer glass in a state before sealing according to an embodiment of the invention.
Figure 7A:
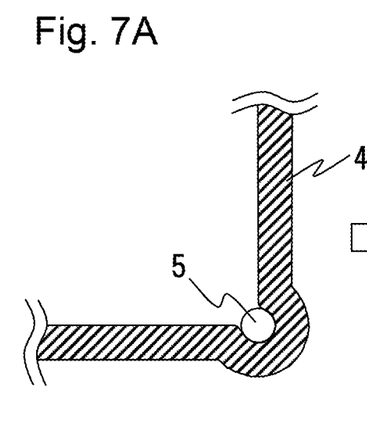
FIGS. 7A and 7B are enlarged views of a periphery of an exhaust port of a multilayer glass according to an embodiment of the invention.
Figure 7B:
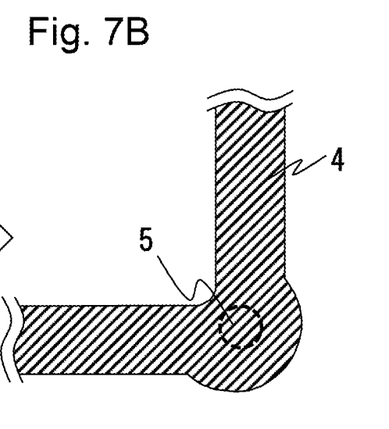

As shown in FIG. 6, an exhaust port may be provided at a position adjacent to a side instead of a corner part of a sealing material that is temporarily baked. Further, in order to reliably block the exhaust port at the time of sealing, the exhaust port 5 may be provided inside the sealing part 4 as shown in FIGS. 7(a) and 7(b). FIG. 7(a) is an enlarged view of a periphery of an exhaust port before sealing and FIG. 7(b) is an enlarged view of the periphery of the exhaust port after sealing. Although formation of the sealing material 4 is complicated, the exhaust port can be reliably blocked at the time of sealing since the exhaust port 5 can be provided at a relatively deep position. The yield of a sealing process is improved.

The exhaust port may be a circle having a diameter smaller than a width of the sealing material 4 that is temporarily baked and equal to or larger than a thickness of the first glass substrate and the second glass substrate. Such a relationship of the size of the exhaust port is a condition when the coating height of the sealing material 4 is about three times the height of the spacers 3. When the size of the exhaust port is larger than the width of the sealing material 4 that is temporarily baked, it is necessary to increase the coating height of the sealing material 4 in proportion to the size of the exhaust port. A shape of the exhaust port is described as a circle, but the shape may be a shape of an ellipse, a long hole, or the like.

(Glass Substrate)

Plate glass that is generally used in multilayer glass can be used in the first glass substrate and the second glass substrate. Examples of the plate glass include float plate glass, template glass, round glass, reinforced glass, wire netting glass, and wired glass. Plate glass in which a heat ray reflection film is laminated on a surface can also be used.

(Spacer)

Spacers are used to maintain a space between the two glass substrates. For example, spacers of a columnar shape, a spherical shape, a linear shape, or a mesh shape can be used as the spacers. The spacers are not particularly limited as long as the spacers have rigidity lower than the plate glass of the multilayer glass and have appropriate compressive strength. For example, glass, metal, alloy, steel, ceramics, and plastic can be used.

A size of the spacers can be selected according to the thickness of a space part between the two glass substrates. For example, when the space between the two glass substrates is 200 μm, spacers having a diameter of about 200 μm may be used as the spacers. An interval between spacers of a spherical shape, a linear shape, and a mesh shape is 200 mm or less, and preferably 100 mm or less and 10 mm or more. The spacers can be provided regularly or irregularly as long as the spacers are within a range of the space described above.

In order to obtain a space part that has an appropriate thickness and a vacuum state, it is effective to introduce spherical beads having a uniform particle diameter into the spacers or the sealing part.

(Sealing Part)

The sealing part 4 is formed with the sealing material 4 containing low melting point glass. Here, the low melting point glass refers to a glass composition that is softened and flows at 600° C. or less. The low melting point glass is preferably a lead-free glass composition containing no lead in terms of an environmental load. The lead-free glass composition in the description refers to a glass composition that intentionally does not contain lead. A glass composition containing 1000 ppm or less lead that is mixed unintentionally is contained in the lead-free glass composition.

The sealing material needs to be selected from materials that can be sealed at or below a heat resistance temperature of the glass substrate. Since the glass substrate is easily damaged by rapid heating or cooling, it is necessary to gradually heat or cool the glass substrate during sealing. Sealing at a temperature as low as possible is required to improve productivity of a vacuum insulation multilayer glass panel. Therefore, it is preferable to use oxide glass containing at least vanadium oxide ($V_2O_5$) and tellurium oxide ($TeO_2$) as the low melting point glass.

The low melting point glass preferably contains silver oxide ($Ag_2O$) in addition to vanadium oxide ($V_2O_5$) and tellurium oxide ($TeO_2$). Glass having a low characteristic temperature at a transition point, a yield point, a softening point, and the like tends to have good softening fluidity at a low temperature. On the other hand, when the characteristic temperature is too low, the glass is easy to be crystallized at the time of heating and baking and the softening fluidity at a low temperature is deteriorated. The glass having lower characteristic temperature has poor chemical stability such as water resistance and acid resistance. Further, an impact on the environmental load tends to be large. For example, in a PbO—$B_2O_3$ based low melting point glass composition in the related art, the higher the content of harmful PbO is, the lower the characteristic temperature can be. However, a tendency of crystallization increases, chemical stability decreases, and an impact on the environmental load also increases.

However, oxide glass containing vanadium oxide, tellurium oxide, and silver oxide can lower the characteristic temperature and reduce crystallization. Silver oxide is provided to lower the characteristic temperature at the transition point, the yield point, the softening point, and the like and to improve chemical stability. Vanadium oxide is provided to prevent silver oxide from being reduced at the time of preparing the glass and to prevent metal silver from precipitating. When silver oxide provided as a glass component does not exist in a state of silver ions in the glass, an effect of a desired low temperature cannot be achieved. When content of silver oxide increases, that is, when the quantity of silver ions in the glass increases, although low temperature can be achieved, content of the vanadium oxide also needs to be increased at this time in order to prevent or reduce precipitation of the metal silver. When preparing the glass, up to two monovalent silver ions with respect to one pentavalent vanadium ion can be contained in the glass. Tellurium oxide is a vitrification component to perform vitrification at the time of preparing the glass. Therefore, when the glass does not contain tellurium oxide, the glass cannot be formed. However, up to one tetravalent tellurium ion with respect to one pentavalent vanadium ion is effective and a compound of tellurium and silver may be precipitated when the proportion is exceeded.

When considering functions of vanadium oxide, tellurium oxide, and silver oxide described above, a total amount of $V_2O_5$ and $TeO_2$ in the low melting point glass composition is preferably 50 mol % or more and 80 mol % or less. When the composition contains $Ag_2O$, a total amount of $V_2O_5$, $TeO_2$, and $Ag_2O$ is preferably 70 mol % or more, and more preferably 80 mol % or more and 98 mol % or less. Content of $V_2O_5$ is preferably 15 mol % or more and 45 mol % or less, content of $TeO_2$ is preferably 15 mol % or more and 45 mol % or less, and content of $Ag_2O$ is preferably 10 mol % or more and 50 mol % or less.

The content of $TeO_2$ is preferably once to twice of $V_2O_5$ by a molar ratio, and the content of $Ag_2O$ is preferably twice or less of $V_2O_5$ by a molar ratio. The content of $Ag_2O$ is preferably twice or less of the content of $V_2O_5$ by a molar ratio. When these components falls below or exceeds these composition ranges, metal silver may be precipitated at the time of preparing the glass, a lower temperature effect may be reduced, crystallization may be obvious at the time of heating and baking, and chemical stability may decrease.

The low melting point glass may contain at least one of $K_2O$, BaO, $WO_3$, $MoO_3$, and $P_2O_5$ with an amount of 30 mol % or less. The low melting point glass preferably contains at least one of $K_2O$, BaO, $WO_3$, $MoO_3$, and $P_2O_5$ with an amount of 20 mol % or less. The low melting glass composition free of lead is easily obtained in a uniform glass state (non-crystalline state) by adding the above components. Further, crystallization tendency of the obtained glass can be inhibited.

The low melting point glass may further contain at least one of $Fe_2O_3$, $Al_2O_3$, $Ga_2O_3$, $In_2O_3$, $Y_2O_3$, $La_2O_3$, $CeO_2$, $Er_2O_3$ and $Yb_2O_3$ as additional components. Content of these additional components is preferably 5 mol % or less, and is preferably 0.1 mol % or more and 3.0 mol % or less. This is because the crystallization tendency can be reduced by containing a small amount of at least one of aluminum and lanthanoid oxides. When the content of aluminum and lanthanoid oxide is less than 0.1 mol %, there is almost no effect of reducing the crystallization tendency. On the other hand, when the content exceeds 5.0 mol %, the characteristic temperature at the softening point and the like may increase or the crystallization tendency may increase conversely. It is effective to contain particularly $Al_2O_3$ and $La_2O_3$ among the aluminum and lanthanoid oxide and an effective content of $Al_2O_3$ and $La_2O_3$ is 0.1 mol % to 1.0 mol %.

According to the above description, a second endothermic peak temperature (softening point) of the lead free glass composition can be set to 300° C. or less according to a differential thermal analysis (DTA). Further, a crystallization start temperature can be set to be higher than the second endothermic peak temperature (softening point) according to the DTA by 100° C. or more. As a result, a sealing material having good softening fluidity at a low temperature and having a high crystallization temperature can be provided. After sealing, the low melting point glass may be crystallized.

Content of the low melting point glass in the sealing material is preferably 40% or more by volume.

In addition to the glass composition, the sealing material used in the sealing part 4 may contain low thermal expansion ceramic particles, metal particles, and the like. The low thermal expansion ceramic particles may be provided to match thermal expansion coefficients of the first glass substrate and the second glass substrate. Examples of the low thermal expansion ceramic particles include Zirconium tungstate phosphate ($Zr_2(WO_4)(PO_4)_2$), niobium oxide ($Nb_2O_5$), β-eucryptite ($LiAlSiO_4$), quartz glass ($SiO_2$), and the like. Among these low thermal expansion fillers, zirconium tungstate phosphate ($Zr_2(WO_4)(PO_4)_2$) is preferable. This is because zirconium tungstate phosphate has good wettability with the lead free low melting point glass that contains vanadium oxide and tellurium oxide. In terms of both airtightness and bonding strength, content of the low thermal expansion filler particles in the sealing material is preferably 10% or more by volume and 45% or less by volume.

The metal particles are preferably low melting point metal or alloy having a melting point of 300° C. or less. Examples of the low melting point metal include tin or tin-based alloy. An example of the tin-based alloy preferably includes alloy containing any one of silver, copper, zinc, and antimony. In terms of heat insulation and bonding strength, content of the metal particles in the sealing material is preferably 10% or more by volume and 70% or less by volume. When paste containing the metal particles is used as the sealing material, the sealing part (after sealing) includes a glass phase 8 and a metal phase 9 and the metal phase 9 is formed at two ends of the glass phase 8. Since the metal phase is formed at two ends of the glass phase, gas released from the glass phase can be blocked by the metal phase.

Figure 8:
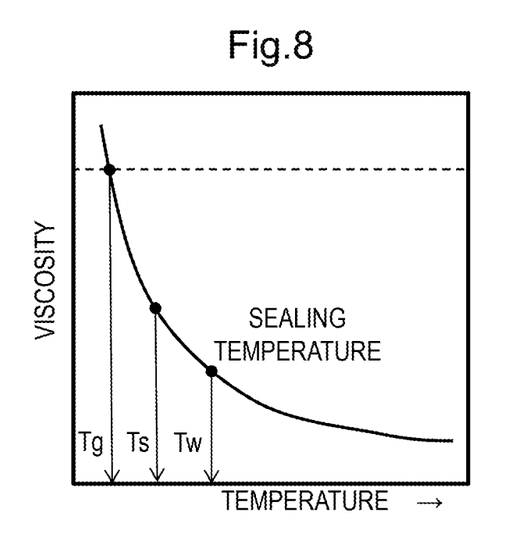
FIG. 8 is a graph showing a relationship between temperature and viscosity of glass.
Figure 9:
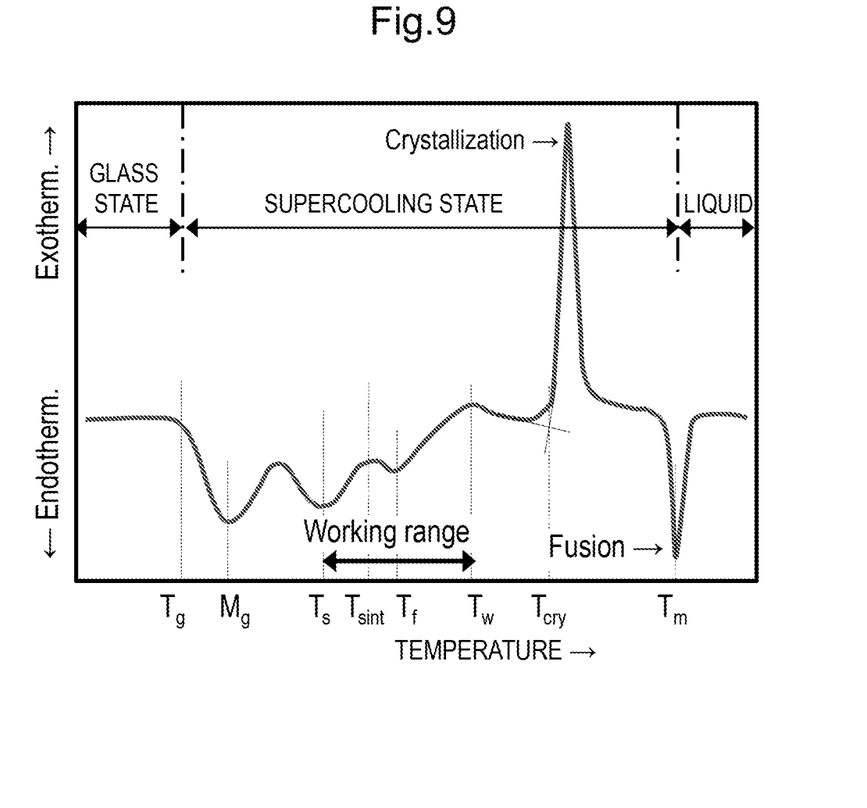
FIG. 9 shows an example of a DTA curve of glass.

Here, the characteristic temperature of the low melting point glass will be described. FIG. 8 is a graph showing changes of glass temperature and viscosity. FIG. 9 shows an example of a graph of the differential thermal analysis (DTA) of the glass composition. In general, glass particles having a particle diameter of about tens of μm are used in the DTA of the glass, alumina (α-$Al_2O_3$) particles having high purity are used as a standard sample, and measurement is performed at a temperature raising rate of 5° C./min in the atmosphere. As shown in FIG. 9, a first endothermic peak start temperature or a temperature at which a state is changed from gas to supercooling liquid is referred to as a transition point $T_g$, a point where the endothermic peak temperature or gas expansion is stopped is referred to as a yield point $M_g$, a second endothermic peak temperature or a softening start temperature is referred to as a softening point $T_s$, a temperature at which glass becomes a sintered body is referred to as a sintering point $T_{sint}$, a temperature at which the glass is melted out is referred to as a flowing point $T_f$, a temperature suitable for molding the glass is referred to as a working point $T_w$, and an exothermic peak start temperature due to crystallization is referred to as a crystallization start temperature $T_{cry}$. Characteristic temperatures at the above points are calculated according to a tangent method.

In addition, the characteristic temperatures at $T_g$, $M_g$, $T_s$ and the like are defined by glass viscosity, in which $T_g$ is a temperature corresponding to $10^{13.3}$ poise, $M_g$ is a temperature corresponding to $10^{11.0}$ poise, $T_s$ is a temperature corresponding to $10^{7.65}$ poise, $T_{sint}$ is a temperature corresponding to $10^6$ poise, $T_f$ is a temperature corresponding to $10^5$ poise, and $T_w$ is a temperature corresponding to $10^4$ poise. The crystallization tendency is determined from $T_{cry}$ and a size of the exothermic peak due to crystallization, that is, an exothermic amount of the crystallization. When the temperature $T_{cry}$ increases greatly, that is, a temperature difference between $T_s$ and $T_{cry}$ increases, the exothermic amount of the crystallization reduces, which means that the glass is unlikely to be crystallized.

Figure 10:
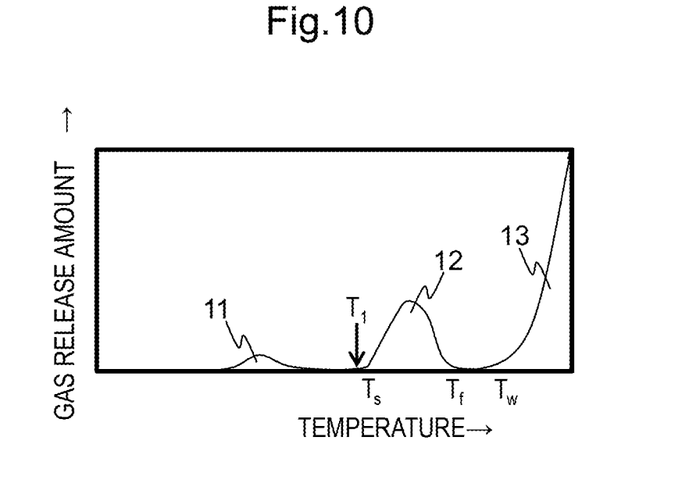
FIG. 10 is a graph showing a relationship between panel temperature and a gas release amount.

A general sealing step at the time of preparing the multilayer glass includes performing heating at a temperature between the vicinity of the softening point $T_s$ of the glass composition used as the sealing material and the working point $T_w$. FIG. 10 shows a relationship between temperature and a gas release amount in the sealing step. When a glass panel is heated, a released gas component 11 is not detected until the softening point $T_s$ of the glass composition used as the sealing material. The released gas component 11 mainly contains moisture or the like that is physically adsorbed on a surface of the glass panel. When the temperature is further raised, a released gas component 12 that is chemically adsorbed on the surface of the glass panel is generated. An amount of the released gas component 12 is small near the flowing point $T_f$ of the glass composition. When the temperature exceeds the working point $T_w$, the low melting point glass composition is reduced, and a released gas component 13 of oxygen that is mainly reduced from the glass is generated. Considering timing of releasing the released gas in FIG. 10, sealing can be performed in a good vacuum state by setting the sealing temperature close to the softening point $T_s$ when an amount of the released gas is small.

Here, in order to cause the sealing part 4 to flow up to the height of the spacers 3, it is necessary to heat the sealing part up to the vicinity of the softening point or to pressurize the sealing part and heat the sealing part up to the vicinity of the flowing point. When the sealing part is heated up to the vicinity of the flowing point, the released gas component 12 is released as shown in FIG. 10. When sealing is performed under such a state, a vacuum degree between the glass substrates is low. On the other hand, since an amount of the released gas component 11 is small in the vicinity of the softening point, the vacuum degree between the glass substrates can be maintained high if sealing can be performed under such a state. An internal side between the glass substrates is evacuated and an external side is in an atmo-spheric state by evacuating the space between the glass substrates after heating the sealing part up to the vicinity of the softening point, so that a pressurizing force caused by a pressure difference may be used to pressurize the glass substrates. As a result, the sealing part 4 can flow and seal even to the vicinity of the softening point, and it is possible to provide the multilayer glass having a good vacuum degree.

(Method for Manufacturing Multilayer Glass)

A multilayer glass according to an embodiment of the invention can be manufactured by sealing a periphery of an internal space with a sealing material and blocking an exhaust port in a state in which the internal space is decompressed by performing exhausting from the exhaust port. Specifically, the method for manufacturing the multilayer glass includes: a step of coating a first glass substrate with the sealing material and temporarily baking the sealing material; a step of forming the exhaust port at a position in contact with the sealing material temporarily baked on the first glass substrate; a step of superimposing and fixing the first glass substrate and a second glass substrate; and an evacuation step in which the periphery of the internal space is sealed with the sealing material by raising temperature in a heating device, and the exhaust port is blocked in a state in which the internal space is decompressed.

Figure 11A:
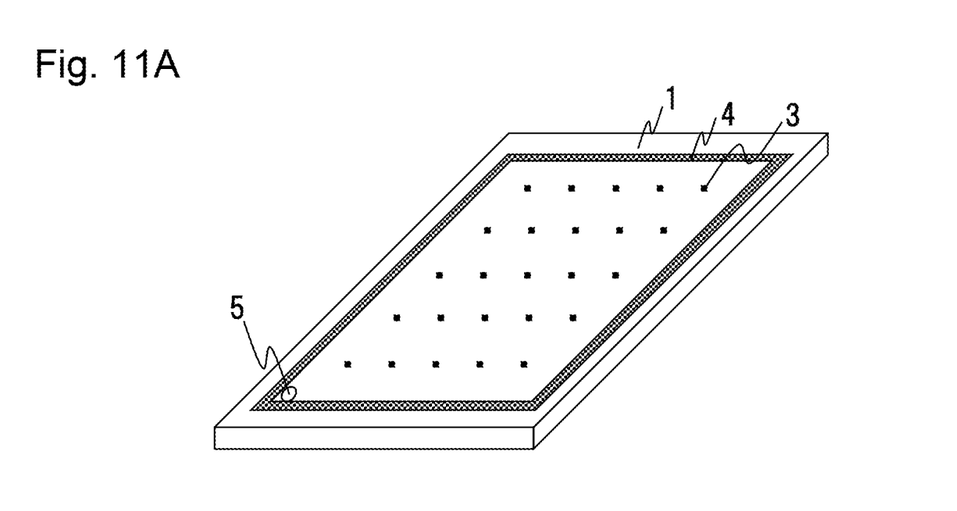
FIGS. 11A to 11C are views illustrating a process of manufacturing the multilayer glass according to the embodiment of the invention.

FIG. 11 shows steps of manufacturing the multilayer glass according to the embodiment of the invention. The first glass substrate 1 is coated with the sealing material 4 containing low melting point glass and the sealing material 4 is temporarily baked (a). In order to reliably block the exhaust port, a height of the sealing material after being temporarily baked is preferably about three times the height of spacers. The exhaust port 5 is provided at a position in contact with the sealing material after being temporarily baked on the first glass substrate, and the spacers 3 are provided. It should be noted that the sealing material may be temporarily baked after the exhaust port is provided on the first glass substrate.

Figure 11B:
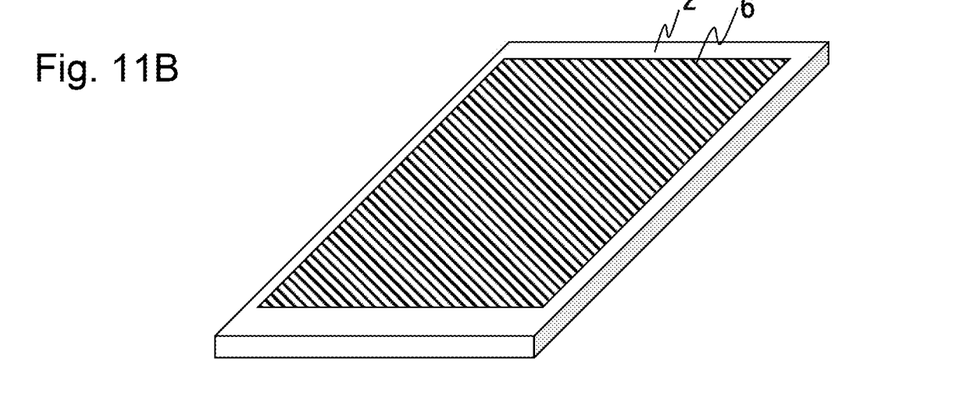

A heat ray reflection film 6 is laminated on a surface of the second glass substrate 2 (b). Although the heat ray reflection film may not be laminated on the second glass substrate 2, a multilayer glass having a higher heat insulation property can be obtained by laminating the heat ray reflection film.

Figure 11C:
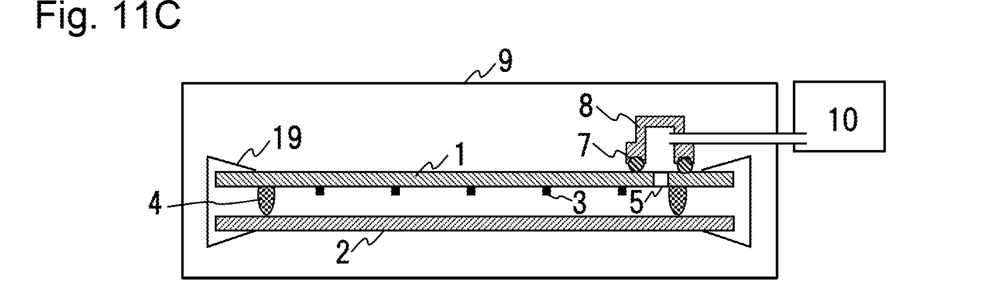

After the first glass substrate and the second glass substrate are superimposed, the glass substrates are fixed by clips 19 so as to prevent displacement and are carried into a heating device 9. An exhaust head 8 is connected to the exhaust port 5 via a ring shaped sealing material 7, and the exhaust head is coupled to a vacuum pump 10 (c). Considering heat resistance of springs, the clips 19 may use a stainless steel material or an inconel material. The heating device 9 that heats glass panels in the atmosphere may be a hot air circulation type heating furnace in which a heater is disposed and to which a fan that equalizes temperature is attached. When the heating temperature is 300° C. or less, an O-ring or the like of a high temperature type Teflon (registered trademark) fluorine resin-based fluororubber can be used as the ring shaped sealing material 7 and vacuum adhesion can be improved. The exhaust head 8 is attached in the heating device 9 via a flexible pipe and is connected to the vacuum pump 10. The exhaust head 8 can evacuate the space between the glass substrates.

The temperature in the heating device 9 is raised to a temperature close to a softening point of a glass composition contained in the sealing material, the fixed first glass substrate and the second glass substrate that are sealed, and the exhaust port is blocked in a state in which the internal space is decompressed by exhausting. The temperature close to the softening point is a temperature of the softening point ±10° C. Here, although the multilayer glass can be prepared without laminating the heat ray reflection film on the second glass substrate in the step (b), it is preferable to form the heat ray reflection film to obtain the multilayer glass with a higher heat insulation property.

Figure 12:
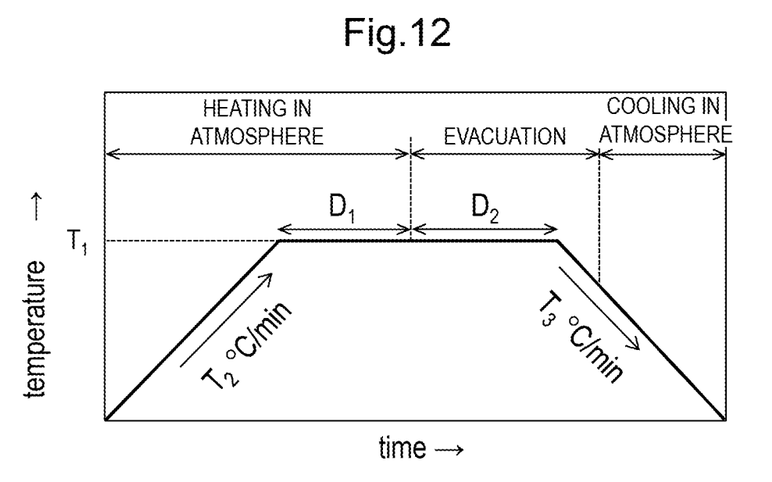
FIG. 12 is a diagram showing a temperature profile in a sealing process.

It is preferable to raise the temperature in the evacuation step to a temperature close to the softening point of the low melting point glass, maintain the temperature for predetermined time, and then perform exhausting while maintaining the temperature. A specific example of a temperature process of the evacuation will be described with reference to FIG. 12. FIG. 12 is a temperature profile of the evacuation step. Heating is performed at a temperature raising rate T2 [° C./min] until a temperature T1 [° C.] that is close to the softening point $T_s$. After the temperature reaches the temperature T1 [° C.], the heating is maintained in the atmosphere for a period of time D1, and then evacuation of the space between the glass substrates is started. The evacuation time is a period from a time point when the evacuation is started at the temperature T1 [° C.] to a time point that is 10 minutes to 30 minutes after cooling is started. The cooling is performed after time D2 [min] until the sealing is completed. The time D1 and the time D2 are determined while observing a sealing state of the glass panels. It is preferably to change the time D1 and the time D2 according to a type of the glass composition used in the sealing material and a panel size. Specifically, D1 is preferably 10 minutes to 30 minutes and a temperature rate T3 at the time of cooling is preferably 1° C./min to 10° C./min.

According to the manufacturing method described above, since the space between the glass substrates is sealed and the exhaust port is also blocked at the same time, a step such as sealing an exhaust pipe after sealing the space between the glass substrates can be omitted and a manufacturing process can be simplified. Since the exhaust head is used to perform exhausting, it is not necessary to use the exhaust pipe and the number of components can be reduced. In the hot air circulation type heating furnace, costs can be reduced by superimposing a plurality of pieces of multilayer glass in multiple stages and simultaneously manufacturing a large number of glass panels.

Figure 13:
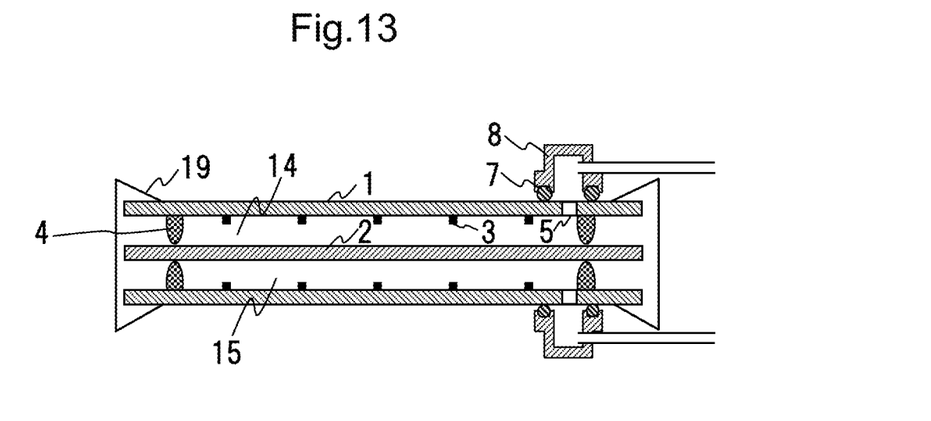
FIG. 13 is a configuration diagram in which a heat insulation layer of the multilayer glass includes two layers.

Multi-layering a heat insulation layer is effective to further improve the heat insulation property. According to the method for manufacturing the multilayer glass according to the embodiment of the invention, multi-layering a vacuum layer can be implemented in a simple manner. A measure corresponding to multi-layering the heat insulation layer can be taken by simply changing a size of the clips 19. It should be noted that when the number of multi-layering increases, thickness and weight of the multilayer glass increases. FIG. 13 shows a manufacturing process at the time of providing two layers of a vacuum layer 14 and a vacuum layer 15. The multilayer glass shown in FIG. 13 includes the first glass substrate 1, the second glass substrate 2 that faces the first glass substrate at an interval of a predetermined space, a third glass substrate that faces the second glass substrate at an interval of a predetermined space, a first internal space 14 defined by the first glass substrate and the second glass substrate, and the sealing material 4 used for sealing a periphery of a second internal space 15 defined by the second glass substrate and the third glass substrate. The sealing material 4 contains the low melting point glass and forms the sealing part. The first internal space and the second internal space are evacuated so as to be in a vacuum state. The first glass substrate and the second glass substrate each include an exhaust port that is provided to be included in a projection part of the sealing part when being projected in a lamination direction of the first glass substrate and the third glass substrate. The exhaust port is blocked by the sealing material at the time of sealing.

Figure 14:
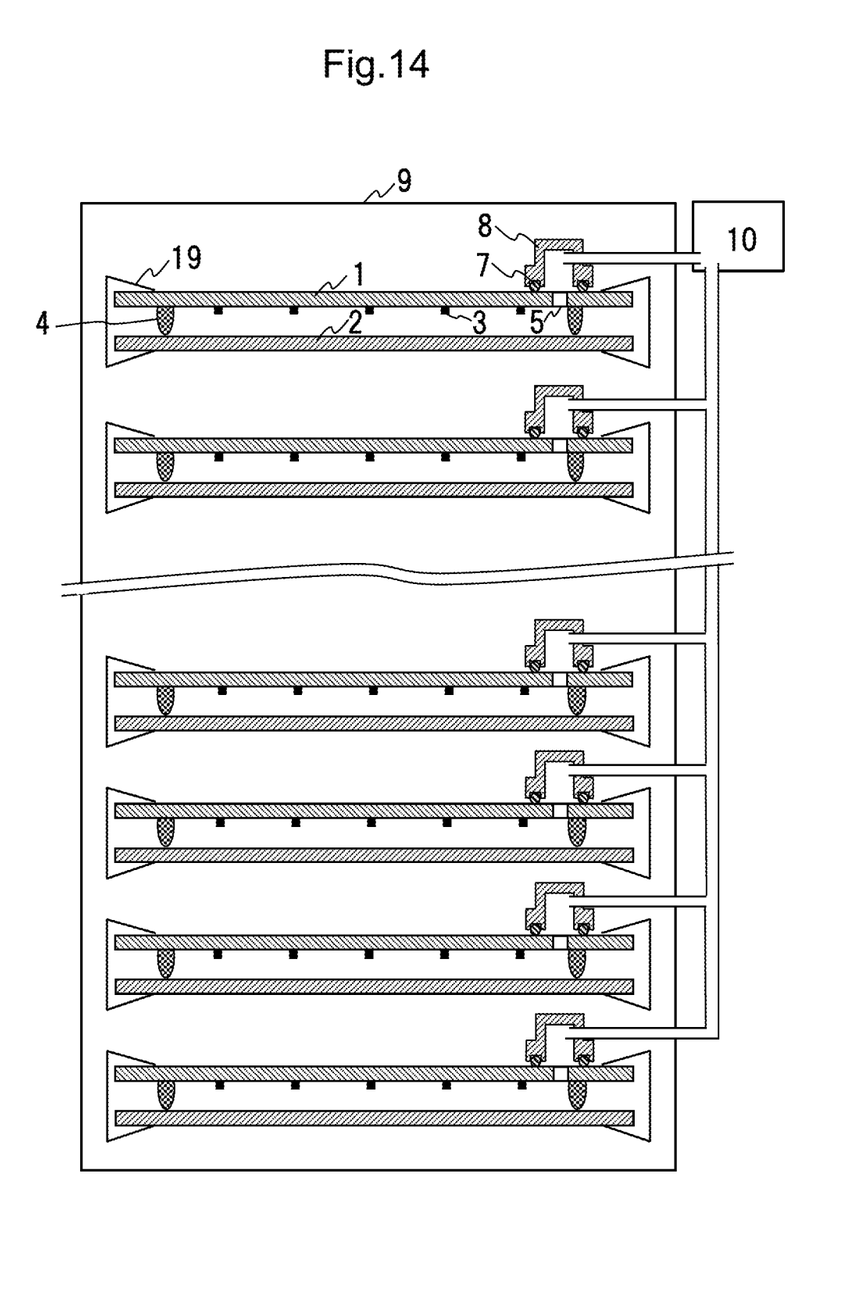
FIG. 14 is a configuration diagram of a multistage panel sealing device.

A batch type panel sealing device including a multistage unit for panels may be used in the evacuation step. In order to supply the vacuum insulation multilayer glass which serves as a building window material to the market, it is necessary to shorten tact time as much as possible and mass production is needed. FIG. 14 shows a batch type panel sealing device including a multistage unit for panels. When the multistage unit for panels is used, a plurality of stages of glass panels can be sealed at the same time. Mass production is improved by superimposing a plurality of pieces of multilayer glass in multiple stages. In the hot air circulation type heating furnace, since temperature distribution in the device can be uniformed at a low cost, processing can be performed in multiple stages at the same time and a yield can be improved.

Figure 15:
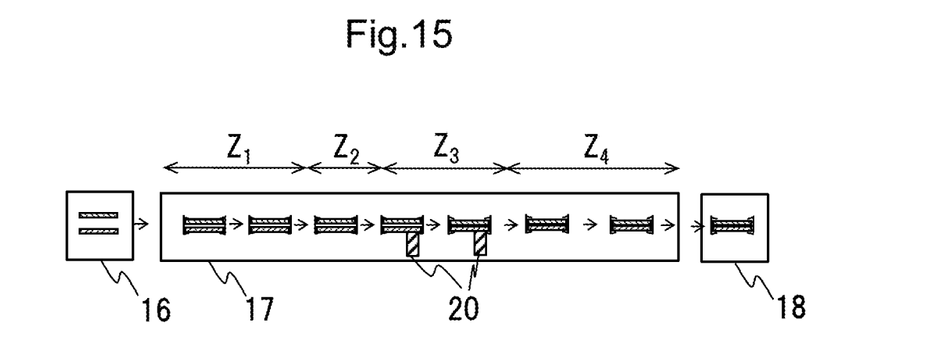
FIG. 15 is a configuration diagram of a sheet panel sealing device.
Figure 16:
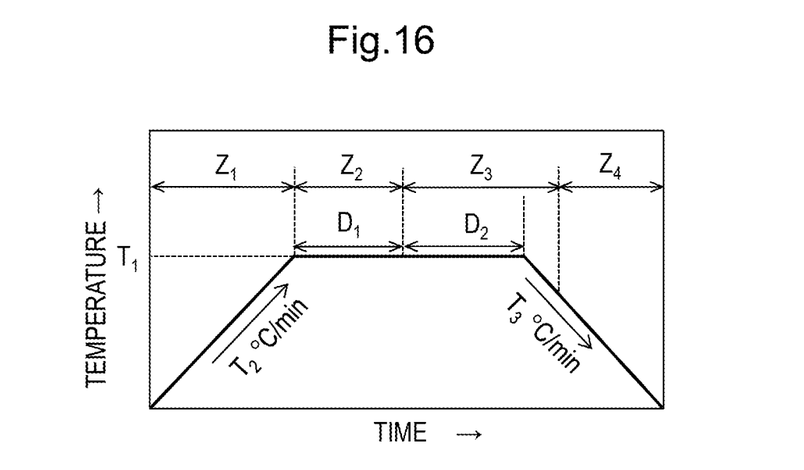
FIG. 16 is a diagram showing a temperature profile in a case of the sheet panel sealing device.

A sheet panel sealing device may be used in manufacturing the multilayer glass. FIG. 15 shows the sheet panel sealing device. The sheet panel sealing device includes a panel carrying in mechanism 16, a tunnel type atmospheric heating furnace 17, and a panel carrying out mechanism 18. First, two glass substrates are fixed by the clips 19 to be a set. The two glass substrates are introduced into the tunnel type atmospheric heating furnace 17 by the panel carrying in mechanism 16. Thereafter, an inside of the tunnel type atmospheric heating furnace 17 is divided into zones Z1 to Z4 to perform heating and cooling, and an inside of glass panels is evacuated by a sheet corresponding vacuum pump device 20 provided in the zone Z3. In the tunnel type atmospheric heating furnace 17, multilayer panels are produced, and completed multilayer panels are carried out by the panel carrying out mechanism 18. FIG. 16 shows a temperature profile when the sheet panel sealing device is used. FIG. 16 may also show a flow process of superimposing panels for a plurality of stages. The tact time can be further shortened by the flow process of superimposing panels for a plurality of stages.

Hereinafter, examples will be described in detail.

EXAMPLES

The multilayer glass panel shown in FIGS. 3 and 4 was produced in examples 1 to 5. The glass composition used in the sealing material was prepared according to the following method.

(Preparation of Glass Composition)

Glass compositions (STA-1 to STA-5) having components shown in Table 1 to be described below were prepared. The components in the table are shown by a molar ratio converted by oxide of each component. Starting raw materials included $V_2O_5$ manufactured by Shinko Chemical Co., Ltd., $Ag_2O$ manufactured by Pure Chemical Co., Ltd. Other oxide powder included oxide powder (purity 99.9%) manufactured by Kojundo Chemical Lab. Co., Ltd.

Powder of the starting raw materials shown in the table by a molar ratio was mixed and placed in a platinum crucible. At the time of mixing, in consideration of avoiding excess moisture absorption into power of raw materials, mixing was performed in a crucible using a metal spoon.

The crucible containing mixed powder of raw materials was disposed in a glass melting furnace and heating and melting were performed. The temperature was raised at a temperature raising rate of 10° C./min, and glass melted at a set temperature (700° C. to 900° C.) was stirred and maintained for an hour. Thereafter, the crucible was taken out from the glass melting furnace and the glass was cast into a graphite mold that was heated to 150° C. in advance. Next, the cast glass was moved to a strain relief furnace that was heated to a strain relief temperature in advance, the temperature was maintained for an hour to remove distortion, and then cooling was performed at a rate of 1° C./min until a room temperature. The glass that was cooled to the room temperature was pulverized to prepare powder of the glass composition containing the components shown in the table.

TABLE 1

| Glass No. | Main component (mol %) | | | Additional component (mol %) | | | | |
|---|---|---|---|---|---|---|---|---|
| | $V_2O_5$ | $TeO_2$ | $Ag_2O$ | $K_2O$ | $WO_3$ | $Fe_2O_3$ | $Al_2O_3$ | $La_2O_3$ |
| STA-1 | 21.0 | 40.0 | 25.0 | 3.0 | 7.0 | 3.0 | 0.5 | 0.5 |
| STA-2 | 21.0 | 40.0 | 25.0 | 3.0 | 7.0 | 3.0 | 1.0 | — |
| STA-3 | 21.0 | 42.0 | 23.0 | 5.0 | 5.0 | 3.0 | — | 1.0 |
| STA-4 | 21.0 | 42.0 | 25.0 | 3.0 | 5.0 | 3.0 | 0.5 | 0.5 |
| STA-5 | 21.0 | 42.0 | 25.0 | 5.0 | 5.0 | 3.0 | 0.5 | 0.5 |

(Evaluation of Characteristic Temperature)

A transition point, a yield point, a softening point, a sintering point, a flowing point, a working point, and a crystallization start temperature were measured for obtained powder of each glass composition according to a differential thermal analysis (DTA). The DTA measurement was performed at a temperature raising rate of 5° C./min in the atmosphere with 650 mg of a reference sample (α-alumina) and of a measurement sample by mass, separately. FIG. 9 shows an example of a DTA curve of glass. As shown in FIG. 9, a first endothermic peak start temperature was referred to as the transition point $T_g$; an endothermic peak temperature thereof was referred to as the yield point $M_g$, a second endothermic peak temperature was referred to as the softening point $T_s$, a temperature at which glass became a sintered body was referred to as the sintering point $T_{sint}$, a temperature at which the glass was melted out was referred to as the flowing point $T_f$, a temperature suitable for molding the glass was referred to as the working point $T_w$, and an exothermic peak start temperature due to crystallization was referred to as the crystallization start temperature $T_{cry}$. These characteristic temperatures were calculated according to a tangential method. Results are shown in Table 2.

TABLE 2

| Glass No. | Characteristic temperature (° C.) | | | | | | |
|---|---|---|---|---|---|---|---|
| | Transition point $T_g$ | Yield point $M_g$ | Softening point $T_s$ | Sintering point $T_{sint}$ | Flowing point $T_f$ | Working point $T_w$ | Crystallization start temperature $T_{cry}$ |
| STA-1 | 224 | 254 | 291 | 308 | 314 | 338 | 408 |
| STA-2 | 213 | 243 | 280 | 295 | 309 | 329 | 403 |
| STA-3 | 215 | 239 | 280 | 295 | 305 | 327 | 396 |
| STA-4 | 213 | 237 | 278 | 291 | 303 | 323 | 409 |
| STA-5 | 208 | 234 | 271 | 287 | 297 | 316 | 413 |

Example 1

(Preparation of Sealing Material)

A glass composition, low thermal expansion ceramic particles, and solvent were blended and mixed to prepare glass paste. STA-5 described in Table 1 was used as the glass composition. A particle size of the glass composition was about 10 Zirconium tungstate phosphate having a particle size of about 30 μm was used in the low thermal expansion ceramic particles. α-terpineol was used in the solvent, and isobornyl cyclohexanol was added as a viscosity modifier. A blended ratio of the lead-free low melting glass composition STA-5 particles and zirconium tungstate phosphate was 55%:45% by volume, and content of solid content of the STA-5 particles and zirconium tungstate phosphate (that is, a total of STA-5 and zirconium tungstate phosphate) was 75% to 80% by mass, and thus glass paste used for low temperature sealing was prepared. Further, in order to maintain a space between glass substrates, the glass paste used for low temperature sealing contained spherical beads of soda-lime glass having a particle size of about 180 μm to 200 μm. With respect to the solid content, content of the spherical beads of soda-lime glass was 1% by volume in the low temperature sealing, and was 20% by volume in the spacers.

(Preparation of Vacuum Insulation Multilayer Glass Panel)

In the present example, soda-lime substrates 1 and 2 having a size of 800 mm×1000 mm×3 mmt were used. Before a sealing step, each substrate was subjected to ozone cleaning to remove contaminants such as organic substances. As shown in FIG. 11, the sealing material prepared on a soda-lime glass substrate 1 side was coated and temporarily baked. After the sealing material was temporarily baked, an exhaust port was prepared at a position in contact with the sealing material that is temporarily baked on the soda-lime glass substrate. Since the soda-lime glass substrates 1 and 2 were likely to be damaged by deformation, a plurality of spacers 3 were two-dimensionally arranged at equal intervals in the space defined by the two glass substrates. A material that was the same as the sealing material that formed the sealing part 4 was used to fix the spacers 3. In order to set the space between the soda-lime glass substrates 1 and 2, that is, the thickness of a space part, to about 200 μm, spherical beads having a diameter a little less than 200 μm were contained in the spacers 3. A stainless steel material was used in the spherical beads. The heat ray reflection film 6 was formed on a soda-lime glass substrate 2 side.

The substrates 1 and 2 were superimposed and glass panels were formed by fixing by a plurality of clips 19. Thereafter, the glass panels were placed in the heating device 9. In the heating device 9, while the glass panels were heated by a hot air circulation type heater, an inside of the glass panels was evacuated by the vacuum pump 10.

Heating was performed according to the temperature profile shown in FIG. 12. Heating was performed at the temperature raising rate T2 [° C./min] until the temperature T1 [° C.] that is a temperature close to the softening point $T_s$ of the used glass paste used for the low temperature sealing. T1 was 270° C. and T2 was 5 [° C./min]. The temperature T1 [° C.] was maintained for time D1 and then evacuation was started using the vacuum pump 10 by the exhaust head 8 via the exhaust port 5 (evacuation). During evacuation, the temperature T1 [° C.] was maintained for time D2 and then cooling was started for 10 to 30 minutes. D1 was 15 minutes, D2 was 30 minutes, and a cooling rate T3 [° C./min] was 5 [° C./min].

(Evaluation of Vacuum Insulation Multilayer Glass Panel)

An appearance inspection was performed on 10 pieces of vacuum insulation multilayer glass panels prepared in the present example. As a result, no fracture or crack was recognized, and there was no problem in appearance. The space between the soda-lime glass substrates 1 and 2 had substantially uniform thickness by the spherical beads contained in the sealing part 4 and the spherical beads contained in the spacers 3. That is, the vacuum insulation multilayer glass panels having a predetermined space part were obtained. It could be confirmed that the exhaust port was sealed with the sealing material and was included in a projection part of the sealing part when it was projected from a lamination direction of the two pieces of plate glass. Further, it could be confirmed that the inside of the panels was in a vacuum state by a helium leak test, and an outer peripheral part of the panels was air-tightly sealed.

In order to confirm reliability of the sealing part 4, three pieces of the manufactured vacuum insulation multilayer glass panels were immersed in hot water at 50° C. for 30 days. It was confirmed that the inside of the panels was maintained in a vacuum state if there was no water entering into the inside of the three pieces of panels. A temperature cycle test from −50° C. to +100° C. was performed 1000 times for another three pieces of vacuum insulation multilayer glass panels. In this test, the inside of the three panels was also maintained in a vacuum state. It was found from the above description that a sealing part having high heat insulation property and high reliability could be obtained in the vacuum insulation multilayer glass panels to which a glass frit used for low temperature sealing or glass paste used for low temperature sealing according to the invention were applied. Further, a sealing temperature can be significantly reduced and productivity of the vacuum insulation multilayer glass panels can be greatly improved by using the glass frit used for low temperature sealing or the glass paste for low temperature sealing according to the invention.

Example 2

Vacuum insulation multilayer glass was prepared in the same manner as in Example 1 except that STA-1 shown in Table 1 was used as a glass composition used in a sealing material and the temperature T1 [° C.] was 290° C.

Similar to Example 1, an appearance inspection, a helium leak test, an immersion test, and a temperature cycle test were performed. The same results as the results in Example 1 were obtained in these tests.

Example 3

Vacuum insulation multilayer glass was prepared in the same manner as in Example 1 except that STA-2 shown in Table 1 was used as a glass composition used in a sealing material and the temperature T1 [° C.] was 280° C.

Similar to Example 1, an appearance inspection, a helium leak test, an immersion test, and a temperature cycle test were performed. The same results as the results in Example 1 were obtained in these tests.

Example 4

Vacuum insulation multilayer glass was prepared in the same manner as in Example 3 except that STA-3 shown in Table 1 was used as a glass composition used in a sealing material.

Similar to Example 1, an appearance inspection, a helium leak test, an immersion test, and a temperature cycle test were performed. The same results as the results in Example 1 were obtained in these tests.

Example 5

Vacuum insulation multilayer glass was prepared in the same manner as in Example 3 except that STA-4 shown in Table 1 was used as a glass composition used in a sealing material.

Similar to Example 1, an appearance inspection, a helium leak test, an immersion test, and a temperature cycle test were performed. The same results as the results in Example 1 were obtained in these tests.

As described above, it was confirmed according to Examples 1 to 5 that a multilayer glass could be manufactured in which an exhaust port was blocked by a sealing material while an internal space was maintained in a vacuum state by providing the exhaust port at a position adjacent to the sealing material and performing sealing while exhausting the internal space by the sealing material.

REFERENCE SIGN LIST 1. first glass substrate
2. second glass substrate
3. spacer
4. sealing material (sealing part)
5. exhaust port
6. heat ray reflection film
7. seal
8. exhaust head
9. hot air circulation type heating device
10. vacuum pump
11. physically adsorbed component
12. chemically adsorbed component
13. low melting point glass reducing component
14. vacuum layer
15. vacuum layer
16. panel carrying in mechanism
17. tunnel type atmospheric heating furnace
18. panel carrying out mechanism
19. clip
20. sheet corresponding vacuum pump apparatus

The invention claimed is:

1. A multilayer glass comprising:
a first glass substrate;
a second glass substrate that faces the first glass substrate at an interval of a predetermined space; and
a sealing part that seals a peripheral part of an internal space defined by the first glass substrate and the second glass substrate, wherein
the sealing part is formed with a sealing material containing low melting point glass,
the internal space is in a vacuum state,
the first glass substrate includes an exhaust port that is provided to be included in a projection part of the sealing part when being projected in a lamination direction of the first glass substrate and the second glass substrate, and
the exhaust port is blocked by the sealing material.

2. The multilayer glass according to claim 1, wherein the first glass substrate includes two or more of the exhaust ports.

3. The multilayer glass according to claim 1, wherein a softening point of the low melting point glass is 300° C. or less.

4. The multilayer glass according to claim 1, wherein the low melting point glass contains $V_2O_5$ and $TeO_2$.

5. The multilayer glass according to claim 4, wherein the low melting point glass further contains $Ag_2O$.

6. A multilayer glass comprising:
a first glass substrate;
a second glass substrate that faces the first glass substrate at an interval of a predetermined space;
a third glass substrate that faces the second glass substrate at an interval of a predetermined space; and
a sealing part that seals a periphery of a first internal space defined by the first glass substrate and the second glass substrate and a periphery of a second internal space defined by the second glass substrate and the third glass substrate, wherein
the sealing part is formed with a sealing material containing low melting point glass,
the first internal space and the second internal space are in a vacuum state,
the first glass substrate and the third glass substrate each include an exhaust port that is provided to be included in a projection part of the sealing part when being projected in a lamination direction of the first glass substrate and the second glass substrate, and
the exhaust port is blocked by the sealing material.

7. A method for manufacturing the multilayer glass according to claim 1, the method comprising:
a step of evacuation in which the exhaust port is blocked in a state in which the internal space is decompressed by performing exhausting from the exhaust port while the periphery of the internal space is sealed with the sealing material.

8. The method for manufacturing the multilayer glass according to claim 7, wherein
in the step of evacuation, temperature raising is performed to a temperature close to a softening point of the low melting point glass, the temperature is maintained for a predetermined period of time, and thereafter exhausting is performed while maintaining the temperature.

9. The method for manufacturing the multilayer glass according to claim 7, further comprising:
temporarily baking the sealing material after the sealing material is coated to the first glass substrate;
forming the exhaust port at a position in contact with the sealing material that is temporarily baked on the first glass substrate; and
superimposing and fixing the first glass substrate and the second glass substrate.

10. The method for manufacturing the multilayer glass according to claim 7, wherein
a heating device in which panels are installable in multiple stages is used in the step of evacuation.

11. The method for manufacturing the multilayer glass according to claim 7, wherein
a device including a panel carrying in mechanism, a tunnel type heating furnace, and a panel carrying out mechanism is used in the step of evacuation.

* * * * *